Dec. 4, 1934.  C. F. CLAUSEN  1,982,792
COMBINATION ANTISKID AND JACK MECHANISM FOR AUTOMOBILES
Original Filed Jan. 5, 1931  2 Sheets-Sheet 1
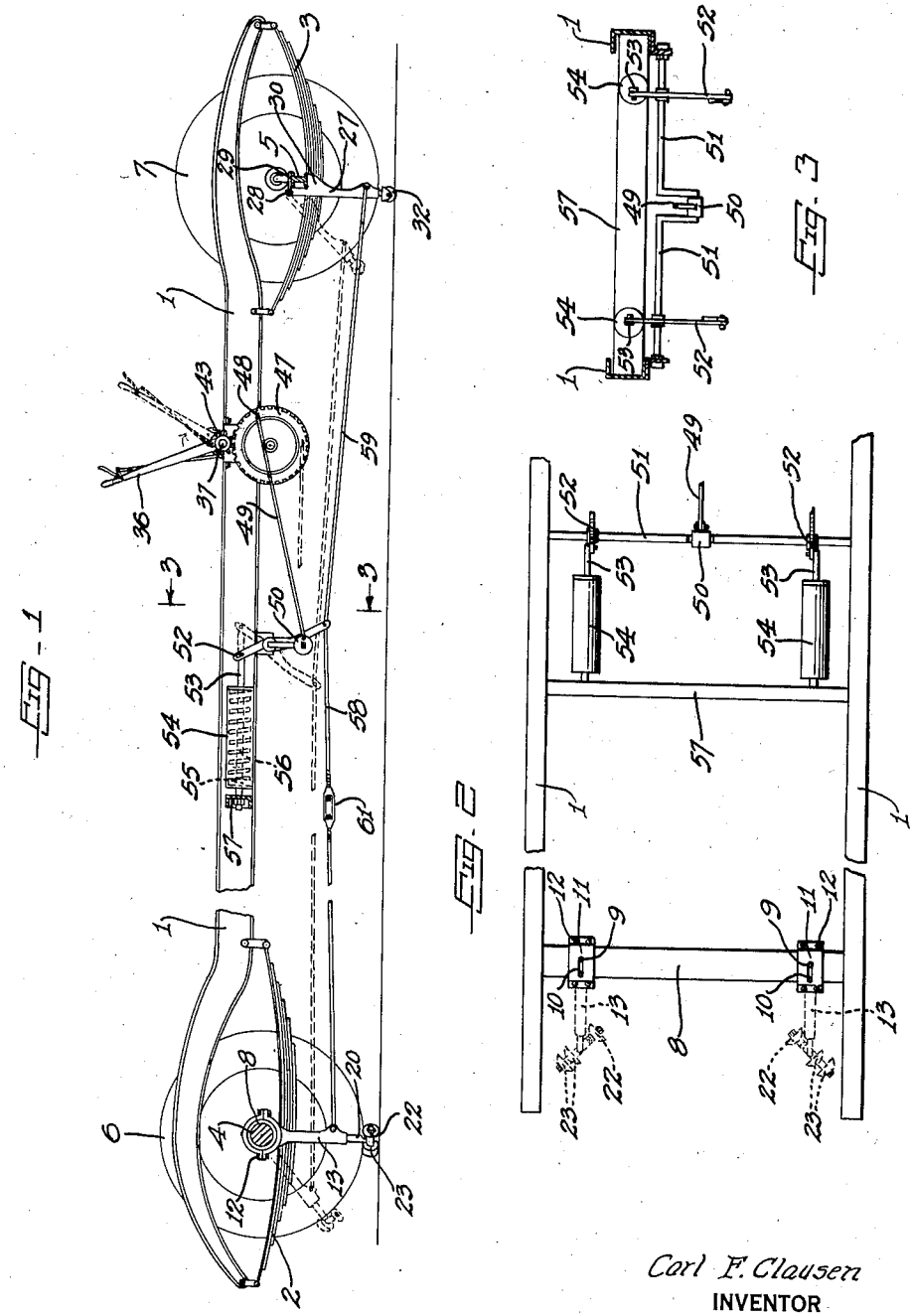
Carl F. Clausen
INVENTOR
BY Munn & Co.
ATTORNEYS Dec. 4, 1934.　　　C. F. CLAUSEN　　　1,982,792
COMBINATION ANTISKID AND JACK MECHANISM FOR AUTOMOBILES
Original Filed Jan. 5, 1931　　2 Sheets-Sheet 2
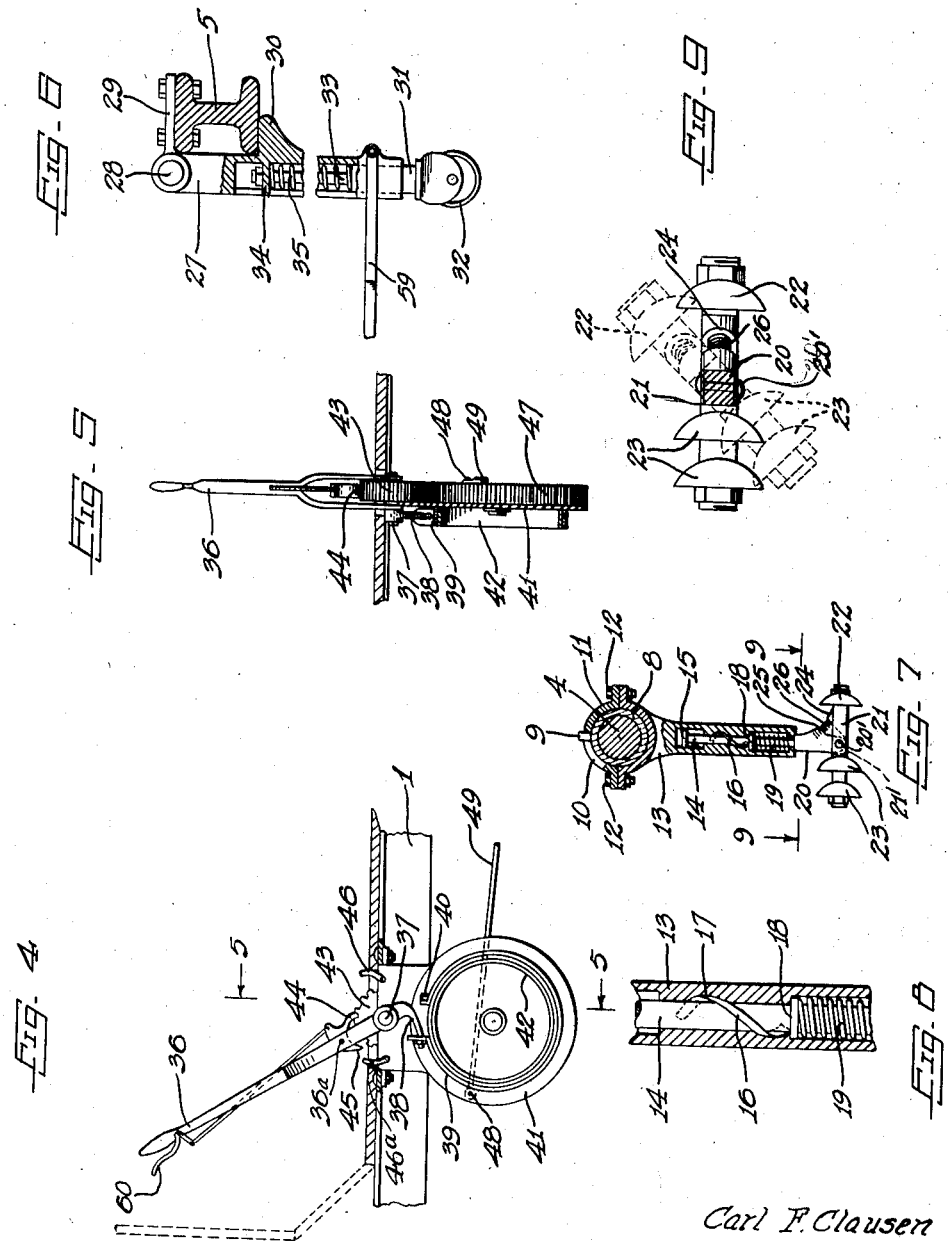
Carl F. Clausen
INVENTOR
BY Munn & Co.
ATTORNEYS Patented Dec. 4, 1934

1,982,792

UNITED STATES PATENT OFFICE 1,982,792

COMBINATION ANTISKID AND JACK MECHANISM FOR AUTOMOBILES

Carl F. Clausen, Grayslake, Ill.

Application January 5, 1931, Serial No. 506,826
Renewed May 1, 1934

10 Claims. (Cl. 188—5)

My invention relates to improvements in combination anti-skid and jack mechanisms for automobiles, and it consists in the combinations, constructions, and arrangements herein described and claimed.

An object of my invention is to provide a device to be carried on an automobile and which may be instantly released to engage the ground so as to prevent skidding of the vehicle.

A further object of the invention is to provide a novel means for locking the anti-skid mechanism to prevent the operation thereof during the normal operation of the car.

A further object is to provide means whereby the anti-skid device may be used as a jack to raise the car from the tires.

A further object is to provide means for jacking up the car and permitting the shifting of the car as in parking the same.

Other objects and advantages will appear in the following specification, and the novel features of the invention will be particularly pointed out in the appended claims.

My invention is illustrated in the accompanying drawings, forming part of this application, in which:

Figure 1 is a longitudinal sectional view through the chassis frame, showing the parts which form the mechanism of the anti-skid and jacking device in elevation, Figure 2 is a plan view of a portion of the chassis frame, showing the location of certain parts appearing in Figure 1, Figure 3 is a sectional view along the line 3—3 of Figure 1, Figure 4 is a sectional detail view of an operating lever and a clutch associated therewith.

Figure 5 is a section along the line 5—5 of Figure 4,

Figure 6 is a detail sectional view showing the manner in which the front anti-skid and jacking elements are swung in a position to support the front axle, Figure 7 is a detail sectional view of one of the rear anti-skid and jacking elements, Figure 8 is an enlarged detail sectional view of a portion of the mechanism shown in Figure 7, and Figure 9 is an enlarged detail view along the line 9—9 of Figure 7.

In the drawings, 1 indicates longitudinal frame members of the chassis. The rear springs are indicated at 2, the front springs at 3, the rear axle at 4, and the front axle at 5. The rear wheels are shown at 6 and the front wheels at 7.

Referring now particularly to Figure 7, it will be observed that the axle 4 is provided with a usual axle housing 8. The latter has a pin 9 which is disposed in a slot 10 of a cap 11. The cap 11 is secured by means of bolts 12 or in any other suitable manner to an arm 13 so that the arm will rotate freely about the axle housing, being limited in its movement by the pin 9. The arm 13 is hollow, as shown in Figures 7 and 8, and within this hollow portion is a spindle 14 having a head 15. The spindle is provided with a helical thread 16 arranged to enter a helical groove 17 in the walls of the member 13.

A collar 18 is provided on the spindle 14 and a coiled tension spring 19 surrounds a portion of the spindle and is secured to the end of the hollow arm, which, as will be seen in Figure 7, is closed except where the spindle passes through. The spindle is secured to a block 20. A shaft 21 is provided with an opening 21' therein for receiving a portion of the block 20 and is pivotally connected with the block by a pin 20'. Mounted on one end of the shaft 21 is a wheel-like member 22 having a sharp edge and on the opposite end of the shaft are two members 23 of the same type. The shaft 21 has a lug 24 and between this lug and a shoulder 25 on the block 20 is a cushion spring 26 the purpose of which will be explained later.

At the front of the vehicle is an arm 27 which is also hollow. This arm is pivoted at 28 to a bracket 29 carried by the front axle 5. The arm is provided with a lug 30, which, in the position shown in Figure 6, is underneath the axle. In the bottom of the arm 27 is a spindle 31 which bears a caster wheel 32. This spindle has a reduced portion 33 which extends through a plate 34. A spring 35 surrounds the portion 33 and bears at one end on the plate 34 and at the other end on the spindle 31. When a thrust comes on the bottom of the caster wheel, the latter will give against the compression of the spring 35.

It will be understood that there are two rear arms such as that shown at 13 and two front arms, such as that shown at 27. These arms are manipulated by means of a lever 36. In Figure 1 I have shown the normal position of the arms and of the lever in dotted lines; that is to say, the position which the parts take when the automobile is running normally. The lever 36 is pivotally mounted at 37 on the chassis frame and an extension 38 is secured to a band brake 39, the opposite end of the band brake being secured at 40 to a plate 41 as shown in Figures 4 and 5.

A drum portion 42 is secured to the plate 41 and it is about this drum portion that the band brake operates. A gear 47 is in mesh with a gear 43. The lever has a double acting pawl which is pivotally mounted on the lever at 36a and which has a tooth 44 on one side of the pivotal mounting and a second tooth 45 on the opposite side. A locking dog 46 is provided for engagement with the teeth of the gear 43.

The gear 47 is secured to the plate 41. The latter bears a crank pin 48 to which is attached a rod 49 leading to a crank portion 50 on a rod 51, see Figures 2 and 3. The rod 51 is rotatable on its axis, being mounted as shown in Figure 3 on the chassis frame 1. On each side of the crank portion is a lever such as those shown at 52. One end of these levers 52 is attached to a spindle 53 which passes into a cylinder 54 and is provided with a head 55 which bears on a spring 56. As will be observed from Figures 2 and 3, there are two of these cylinders, the rear ends of these cylinders being attached to a crossbar 57. The lower end of each of the levers 52 is attached by means of rods such as that shown at 58 to one of the arms 13, while a rod 59 extends from the levers 52 to each of the front arms 27.

From the foregoing description of the various parts of the device, the operation thereof may be readily understood. As will be seen from the drawings, the rod 49 controls the arm members 13 and 27 on each side of the vehicle. The normal position of the parts is that shown in dotted lines in Figure 1. In this position, the arm members 13 and 27 are held out of the way. Figure 4, which is a view from the opposite side of Figure 1, shows also the position of the brake mechanism when members 13 and 17 are raised. Consider Figure 4. When the lever 36 has been pulled to the left hand position shown in Figure 4, the tooth 44 engages the gear 43 while the brake band is drawn tightly so as to lock the plate 41 and also the gear 47 to which it is attached. There is therefore a double locking means provided.

Now if the vehicle should start to skid, the handle 60 on the lever 36, which is attached to the member bearing the pawls 44 and 45, is gripped and the lever is swung from the dotted line position of Figure 1 to the full line position. The gripping action on the handle 60 is sufficient only to lift the pawl 44 from the gear 43 and thus release the same. The movement of the lever to the right disengages the brake so as to permit the gears 47 and 43 to turn freely. The springs 56 in the cylinders 54 will tend to move the levers 52 from the dotted line position shown in Figure 1 to the full line position, the rod 49 moving and turning the disc 41 since the gears connected thereto are free to move. The movement of the levers 52 will bring the arms 13 and 27 down until they strike the ground. The sharp discs carried by the arms 13 are normally angularly disposed with respect to the longitudinal axes of the shaft to which the arm is attached, and, when these members strike the ground, there will be a tendency to keep the vehicle from skidding since, as shown in Figure 2, the wheel-like members on opposite sides of the center of the vehicle are arranged in opposed angular relation. It will be understood that the bringing of these sharp wheels into contact with the ground is done instantaneously after the lever 36 is moved from left to right in Figure 4.

When it is desired to return the members 13 and 27 to the inoperative or dotted line position shown in Figure 1, the gear 47 is rotated clockwise by means of the lever 36. The power stroke of the lever is from right to left, as viewed in Figure 4, and during this stroke the pawl 44 engages the gear 43 which in turn operates the gear 47 which, through the medium of the rod 49, swings the crank 50 clockwise and the rods 58 and 59 to the rear. The movement of the parts mentioned is against the action of the springs 56, and hence a dog or pawl 46a (shown in Figure 4) is employed to hold the gear 43 during the return stroke of the lever 36. In case it is desired to jack up the car, the locking dog 46, see Figure 4, is thrown over against the teeth of the gear 43. The handle 60 is grasped and the lever 36 is worked backwardly and forwardly. The grasping of the handle 60 will cause the tooth 45 to engage the gear and will raise the pawl 44 so that in a movement from right to left in Figure 4, the gear 43 will be rotated counterclockwise, as shown by the arrow, the pawl 46 keeping it from reversing. When the lever is moved back, still grasping the handle 60, the tooth 45 will ride idly over the gear until the end of the stroke is reached, and on the return stroke, the gear 43 and the gear 47 will be turned. This will tend to positively draw the arms 13 and 27 into contact with the ground.

The wheel-like members on the arm 13 will first reach the ground. This may be accomplished by means of a turnbuckle adjustment 61, see Figure 1. The rear wheels will be slightly raised before the front wheels and the car will then tend to settle back so as to bring the arm 27 with its casters in a position shown in full lines in Figure 1 in which the lug 30 is against the under portion of the axle 5 so as to support it.

Normally, as stated, the axle 21 is angularly disposed with respect to the longitudinal axis of the shaft 4, but, when the sharp discs strike the ground, the block 20 and the rod 14 are moved upwardly and, owing to the thread 16, will be turned to bring these sharp wheels at right angles to the wheels of the car, in which position the wheels 22, 23 are shown in Figure 7. The block 20 and the rod 14 are shown in their uppermost positions in Figure 7, at which time the arm 13 is in the vertical position shown in Figure 1. In order to provide a cushioning effect as stated, the spring 26 is used. The spring 26 has its opposite end portions fixedly connected with the head portion 15 and the arm portion 13, respectively, by any suitable means, not shown, and is shown in its extended position in Figure 7.

The device may be used as a jack for jacking up the car to remove a tire or to replace it and it also may be used as a parking device. When it is desired to park the car in a short space where one could not ordinarily drive in and work the car into the space by means of the steering wheel, but which space might be long enough to permit the car to be parked if the rear end were swung around, it is only necessary to drive the front end of the car close to the car in front of it, then to manipulate the lever 36 so as to raise the car in the manner already described. The wheels 22, 23 will be turned to the position shown in Figure 7 by the threads 16 as above described, after which, by pushing the rear end toward the curb, the rear end will be swung around and the wheel-like members 22 and 23 will act as truck wheels to permit the swinging of the rear end close to the curb line. Of course a car may be moved out from a space by jacking it up, swinging out the rear end, and then letting the car down on the tires.

I claim:

1. The combination with an automobile chassis, of a plurality of pivoted arms carried by the chassis, means for locking the pivoted arms in a normally inoperative position, said means including a gear train, a brake for preventing the movement of the gear train, and a stop pawl for engaging the gear train, a lever for releasing the brake and the stop pawl simultaneously, and spring actuated means for swinging the arms into engagement with the ground.

2. In an anti-skid and jacking mechanism for automobiles, a pair of arms pivoted at one end to swing about the longitudinal axis of the rear axle, a movable spindle carried at the end of each arm, an axle carried by said spindle, wheels carried by said axle, means for positively forcing the wheels against the ground, and means actuated by the thrust against the ground for rotating the spindle to change the normal position of the wheels.

3. The combination with the chassis of an automotive vehicle, of an arm swingably carried by the chassis, a shaft rotatably carried by the chassis and operatively connected with the arm, a gear rotatably carried by the chassis, means operatively connected with the gear and shaft for rotating one when the other is rotated, and a braking means operatively connected with the gear for holding the gear against movement for retaining the arm in a position out of engagement with the ground.

4. The combination with the chassis of an automotive vehicle, of an arm swingably carried by the chassis, a shaft rotatably carried by the chassis and operatively connected with the arm, a gear rotatably carried by the chassis, means operatively connected with the gear and shaft for rotating one when the other is rotated, a braking means operatively connected with the gear for holding the gear against movement for retaining the arm in a position out of engagement with the ground, an actuating lever, means for operatively connecting the actuating lever with the gear, and means for connecting the actuating lever with the braking means, said two last-named means being operable for simultaneously disconnecting the lever from the gear and releasing the braking means whereby the arm may be moved into engagement with the ground.

5. The combination with the chassis of an automotive vehicle, of an arm swingably carried by the chassis, a shaft rotatably carried by the chassis and operatively connected with the arm, a gear rotatably carried by the chassis, means operatively connected with the gear and shaft for rotating one when the other is rotated, a braking means operatively connected with the gear for holding the gear against movement for retaining the arm in a position out of engagement with the ground, a pinion gear rotatably carried by the frame and in mesh with the gear, an actuating lever, a pawl member movably connected with the lever and operatively associated with the pinion gear, and means for connecting the lever with the braking means, said pawl member and last-named means being operable for simultaneously disconnecting the lever from the pinion gear and releasing the braking means whereby the arm may be moved into engagement with the ground.

6. The combination with the chassis of an automotive vehicle, of an arm swingably carried by the chassis, a shaft rotatably carried with the chassis and operatively connected with the arm, a gear rotatably carried by the chassis, means operatively connected with the gear and shaft for rotating one when the other is rotated, a braking means operatively connected with the gear for holding the gear against movement for retaining the arm in a position out of engagement with the ground, an actuating lever, means for operatively connecting the actuating lever with the gear, means for connecting the actuating lever with the braking means, said two last-named means being operable for simultaneously disconnecting the lever from the gear and releasing the braking means whereby the arm may be moved into engagement with the ground, and spring means connected with the shaft for rotating the same for moving the arm into engagement with the ground.

7. The combination with the chassis of an automotive vehicle, of an arm swingably carried by the chassis, a shaft rotatably carried by the chassis and operatively connected with the arm, a gear rotatably carried by the chassis, means operatively connected with the gear and shaft for rotating one when the other is rotated, a braking means operatively connected with the gear for holding the gear against movement for retaining the arm in a position out of engagement with the ground, a pinion gear rotatably carried by the frame and in mesh with the gear, an actuating lever, a pawl member movably connected with the lever and operatively associated with the pinion gear, means for connecting the lever with the braking means, said pawl member and last-named means being operable for simultaneously disconnecting the lever from the pinion gear and releasing the braking means whereby the arm may be moved into engagement with the ground, and spring means connected with the shaft for rotating the same for moving the arm into engagement with the ground.

8. The combination with the chassis of an automotive vehicle, of an arm swingably carried by the chassis, a gear rotatably carried by the chassis, means for operatively connecting the gear with the arm for moving one when the other is moved, and a braking means operatively connected with the gear for holding the gear against movement for retaining the arm in a position out of engagement with the ground.

9. The combination with the chassis of an automotive vehicle, of an arm swingably carried by the chassis, a gear rotatably carried by the chassis, means for operatively connecting the gear with the arm for moving one when the other is moved, a braking means operatively connected with the gear for holding the gear against movement for retaining the arm in a position out of engagement with the ground, an actuating lever, means for operatively connecting the actuating lever with the gear, and means for connecting the actuating lever with the braking means, said two last-named means being operable for simultaneously disconnecting the lever from the gear and releasing the braking means whereby the arm may be moved into engagement with the ground.

10. The combination with the chassis of an automotive vehicle, of an arm swingably carried by the chassis, a gear rotatably carried by the chassis, means for operatively connecting the gear with the arm for moving one when the other is moved, a pinion gear rotatably carried by the chassis and in mesh with the gear, an actuating lever, a double acting pawl member movably connected with the lever and operatively associated with the pinion gear, and means for positioning the pawl member in engagement with the pinion gear for rotating the pinion gear in either direction for swinging the arm in either direction when the lever is moved.

CARL F. CLAUSEN.